(12) United States Patent
Jamtgaard et al.

(10) Patent No.: US 9,411,037 B2
(45) Date of Patent: Aug. 9, 2016

(54) CALIBRATION OF WI-FI LOCALIZATION FROM VIDEO LOCALIZATION

(75) Inventors: Mark Jamtgaard, Mountain View, CA (US); Nathan Mueller, Mountain View, CA (US)

(73) Assignee: RETAILNEXT, INC., San Jose, CA (US)

( * ) Notice: Subject to any disclaimer, the term of this patent is extended or adjusted under 35 U.S.C. 154(b) by 649 days.

(21) Appl. No.: 13/212,000

(22) Filed: Aug. 17, 2011

(65) Prior Publication Data

US 2012/0044355 A1 Feb. 23, 2012

Related U.S. Application Data

(60) Provisional application No. 61/374,996, filed on Aug. 18, 2010.

(51) Int. Cl.
*H04N 5/38* (2006.01)
*G01S 5/00* (2006.01)

(52) U.S. Cl.
CPC ...................... *G01S 5/00* (2013.01)

(58) Field of Classification Search
USPC ........................................................ 348/159
See application file for complete search history.

(56) References Cited

U.S. PATENT DOCUMENTS

| | | | |
|---|---|---|---|
| 2005/0093976 A1 | 5/2005 | Valleriano et al. | |
| 2008/0113672 A1* | 5/2008 | Karr et al. | 455/456.1 |
| 2008/0303901 A1 | 12/2008 | Variyath et al. | |
| 2009/0092113 A1* | 4/2009 | Doshi | H04W 24/04 370/338 |
| 2009/0219209 A1* | 9/2009 | Bush et al. | 342/450 |
| 2009/0265105 A1* | 10/2009 | Davis et al. | 701/300 |
| 2009/0280824 A1 | 11/2009 | Rautiainen | |
| 2010/0103173 A1 | 4/2010 | Lee et al. | |
| 2010/0150404 A1 | 6/2010 | Marks et al. | |
| 2010/0166260 A1* | 7/2010 | Huang et al. | 382/103 |
| 2011/0013836 A1* | 1/2011 | Gefen et al. | 382/171 |
| 2011/0065451 A1 | 3/2011 | Danado et al. | |
| 2011/0135149 A1* | 6/2011 | Gefen | 382/103 |
| 2011/0285851 A1* | 11/2011 | Plocher et al. | 348/152 |
| 2013/0107057 A1* | 5/2013 | Zhou et al. | 348/169 |

FOREIGN PATENT DOCUMENTS

| | | |
|---|---|---|
| KR | 10-2010-0025338 | 3/2010 |
| KR | 10-2010-0026776 | 3/2010 |

OTHER PUBLICATIONS

International Search Report and the Written Opinion of the International Searching Authority dated Apr. 9, 2012 for Application No. PCT/US2011/048294.
International Preliminary Report on Patentability for International Patent Application No. PCT/US2011/048294, filed Aug. 18, 2011.

* cited by examiner

*Primary Examiner* — Jay Patel
*Assistant Examiner* — Neil Mikeska
(74) *Attorney, Agent, or Firm* — Dergosits & Noah LLP; Todd A. Noah

(57) ABSTRACT

In some implementations, video camera networks can be used to track people or objects and determine their locations. In some implementations, location accuracy better than one meter can be achieved using video cameras. According to some implementations, Wi-Fi localization and video localization systems can be fused together to perform calibration. In some implementations, by using the video network to continuously update the Wi-Fi localization calibration database, Wi-Fi location accuracy can be improved.

21 Claims, 13 Drawing Sheets

Camera 604 Image

Camera 606 Image

Camera 602 Image

Camera 604 Occupancy Map

Camera 606 Occupancy Map

Camera 602 Occupancy Map

CALIBRATION OF WI-FI LOCALIZATION FROM VIDEO LOCALIZATION

CROSS-REFERENCE TO RELATED APPLICATIONS

This application claims priority to U.S. Provisional Application Ser. No. 61/374,996, entitled "Calibration of Wi-Fi Localization from Video Localization," filed on Aug. 18, 2010, the entire contents of which are incorporated herein by reference.

TECHNICAL FIELD

This invention relates to location-based services (LBS) and to determining the location of a person or object carrying a Wi-Fi based device. Specifically, this invention relates to the calibration of a wireless localization system to increase accuracy and precision, using a video camera system.

BACKGROUND

Applications requiring the location of wireless mobile devices are referred to as location-based services (LBS). These services require the identity of the device and the device's location. Wireless infrastructure, such as Wi-Fi access points, can be used to determine the location of Wi-Fi devices based on radio waves received or emitted by the device. Three or more wireless receivers record the received signal strength, time-of-arrival, or the angle-of-arrival of the radio frequency signals from the mobile device. These receivers could be Wi-Fi, Bluetooth, RFID, or other wireless devices. A location server processes the data from these receivers to determine the mobile device's location. When the application needs a device's location, it sends a request to the location server with the device's network identifier. Finally, the location server responds to the application with the device's location.

Wi-Fi infrastructure is widely deployed and the ability to use this existing infrastructure for LBS is desirable. Many LBS require position accuracy of less than one meter to be effective. However, this accuracy is difficult to achieve using wireless location systems due to multipath, especially indoors.

Many wireless systems and techniques exist to determine the position of a radio-frequency device including GPS, Wi-Fi, and ultra-wideband. Various radio wave features can be used to determine location, including receive signal strength (RSS), time of arrival (TOA), angle of arrival (AOA), or time difference of arrival (TDOA) among other techniques. RSS and TDOA are the two most popular Wi-Fi location methods. In a localization system using receive signal strength (RSS), the RSS is measured at each access point (AP) and the distance from the AP to the wireless device is calculated based on a path loss model. Given three or more APs simultaneously measuring the RSS from a wireless device, the wireless device's location can be calculated using multilateration algorithms. The time-difference-of-arrival (TDOA) method allows the distance between the AP and the wireless device to be measured directly. The time it takes for the radio signal to travel from the wireless device to the AP is measured.

Both RSS and TDOA localization methods suffer degraded accuracy from multipath. Multipath is a phenomena where an electromagnetic wave follows multiple paths to a receiver. Multipath is caused by three effects: reflections, scattering, and diffraction. Reflections occur when an electromagnetic wave encounter an obstacle larger in size than the wavelength of the signal. Scattering occurs when an electromagnetic wave encounters an obstacle whose size is smaller than the wavelength of the signal. Diffraction occurs when an electromagnetic wave encounters a surface with irregular edges, and travels along a path other than the line of sight. The wavelength of 2.4 GHz Wi-Fi signals is 12.5 cm. Multipath makes it very difficult to determine locations accurately and degrades both methods of localization. Using RSS for localization, it is difficult to create an accurate propagation model due to multipath. In a TDOA system, it is difficult to find the first arrival due to constructive and destructive multipath arriving shortly after the direct path. For both of these systems, it is difficult to attain better than ten meters of accuracy.

To improve accuracy, pattern matching can be used. For example, an area where location-based services are to be provided can be calibrated during an offline site survey process. During calibration, access point parameters such as RSS, TDOA, or multipath signatures can be recorded throughout the entire space where location-based services are needed. Although the pattern matching localization technique achieves better than two-meter accuracy after a site calibration process, the accuracy can quickly degrade to greater than ten meters.

SUMMARY

In some implementations, video camera networks can be used to track people or objects and determine their locations. In some implementations, location accuracy better than one meter can be achieved using video cameras. According to some implementations, Wi-Fi localization and video localization systems can be fused together to perform calibration. For example, the video camera network can track moving objects and associate each object with a Wi-Fi network identifier. When the video system has the location of a Wi-Fi device calculated, it can request measurements from the Wi-Fi network for the Wi-Fi device and can update the Wi-Fi pattern matching calibration database. In some implementations, by using the video network to continuously update the Wi-Fi localization calibration database, Wi-Fi location accuracy can be improved.

DETAILED DESCRIPTION

Figure 1:
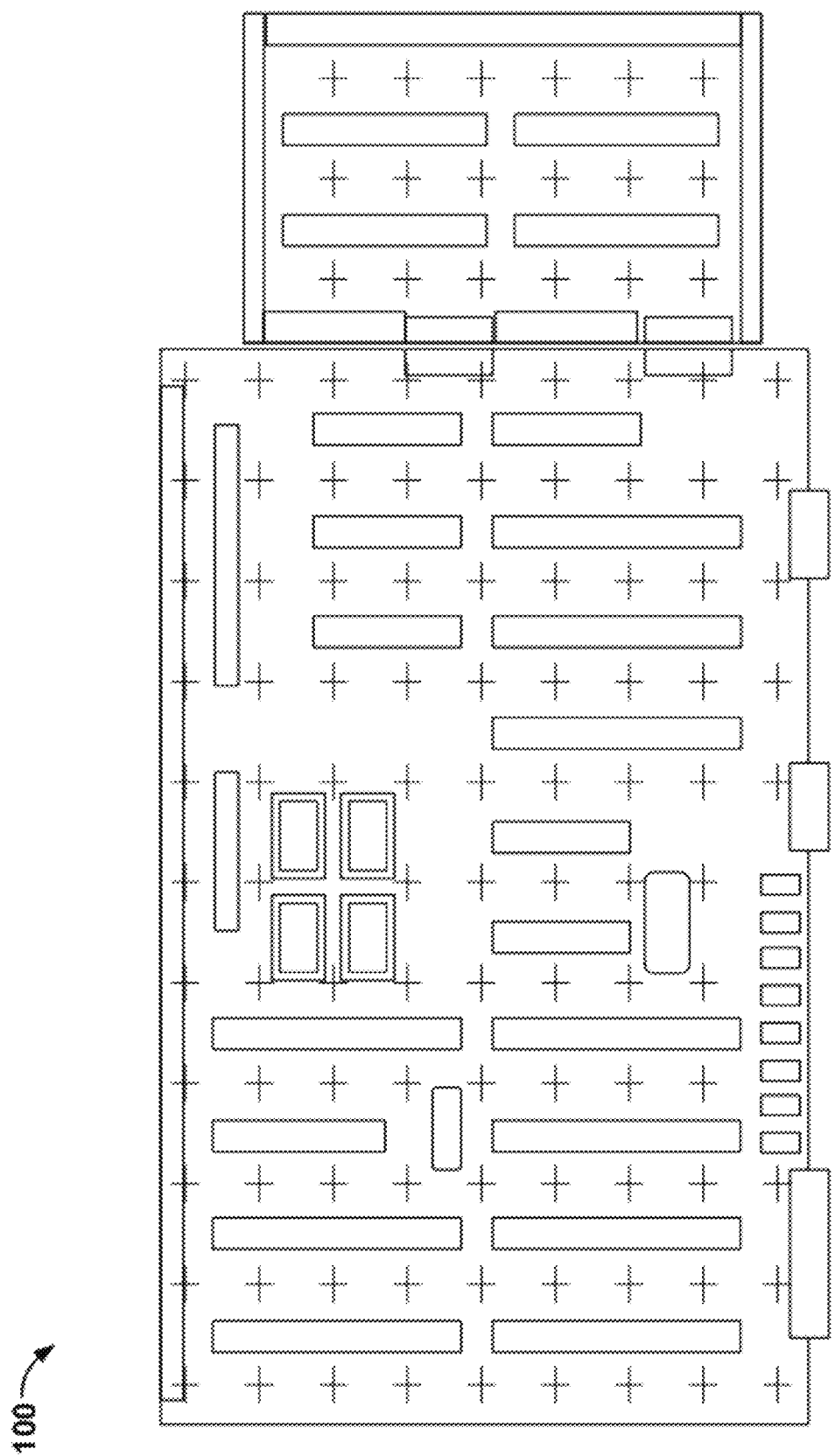
FIG. 1 illustrates an example diagram of site survey for calibrating a pattern matching localization system for a building.

FIG. 1 illustrates an example diagram 100 of site survey for calibrating a pattern matching localization system for a building. For example, a site survey can take measurements every square meter throughout an entire building. The red crosses in diagram 100 represent positions in the building where measurements are taken. Calibration can be a time consuming process. Even for a small space, a large number of measurements may need to be taken. The setup of an accurate grid guide can require a labor-intensive survey. During an online localization phase, access point measurements of the wireless device can be compared to the previous calibration patterns. The location of the calibration pattern closest to the measurement can be determined to be the location of the wireless device.

Pattern matching based localization methods can achieve an accuracy of one to two meters. However, the accuracy can degrade quickly with time. Multipath is sensitive to the instantaneous positions of various objects in the building and RF environments are dynamic. As objects are moved into, out of, or within a building, the RF environment changes. The introduction of a new access point or modification of an existing access point can drastically change the RF environment. The degradation in accuracy of the calibration patterns results in direct degradation of the localization system's accuracy. Performing site surveys weekly, monthly, or even quarterly is often prohibitively expensive and, in most situations, impractical.

In a pattern matching system, rather than calculating the distance from multiple APs to the wireless device and then calculating location using multilateration algorithms, a classification system can be used for localization. A general classification system comprises a sensor generating observations or measurements, a method of extracting features from the measurements, and a classification system that clusters the observations into classes. A supervised classification system uses labeled measurements to train the classification system. For Wi-Fi localization, the measurements are RSS, TDOA, or multipath signature measurements from an AP. These measurements can be taken from three or more APs to generate a feature vector. For example, a system using RSS from five APs, could form a five-dimensional feature vector of RSS values. In current Wi-Fi pattern matching systems, the training data can be collected offline through a manual process of measuring access point receiver parameters from a reference transmit antenna. The measurement process can be repeated throughout the building. The closer together the measurements are, the more accurate the localization process can be.

In some implementations, a Wi-Fi pattern matching localization system is described that does not require an offline calibration phase to collect labeled training data over a large-scale coverage area with fine granularity. For example, the Wi-Fi pattern matching localization system can be initialized with sparse training data and can improve its model using unlabeled data collected over time through normal system use. In some implementations, the system can adapt as the RF environment changes over time without requiring another offline calibration process.

Figure 2:
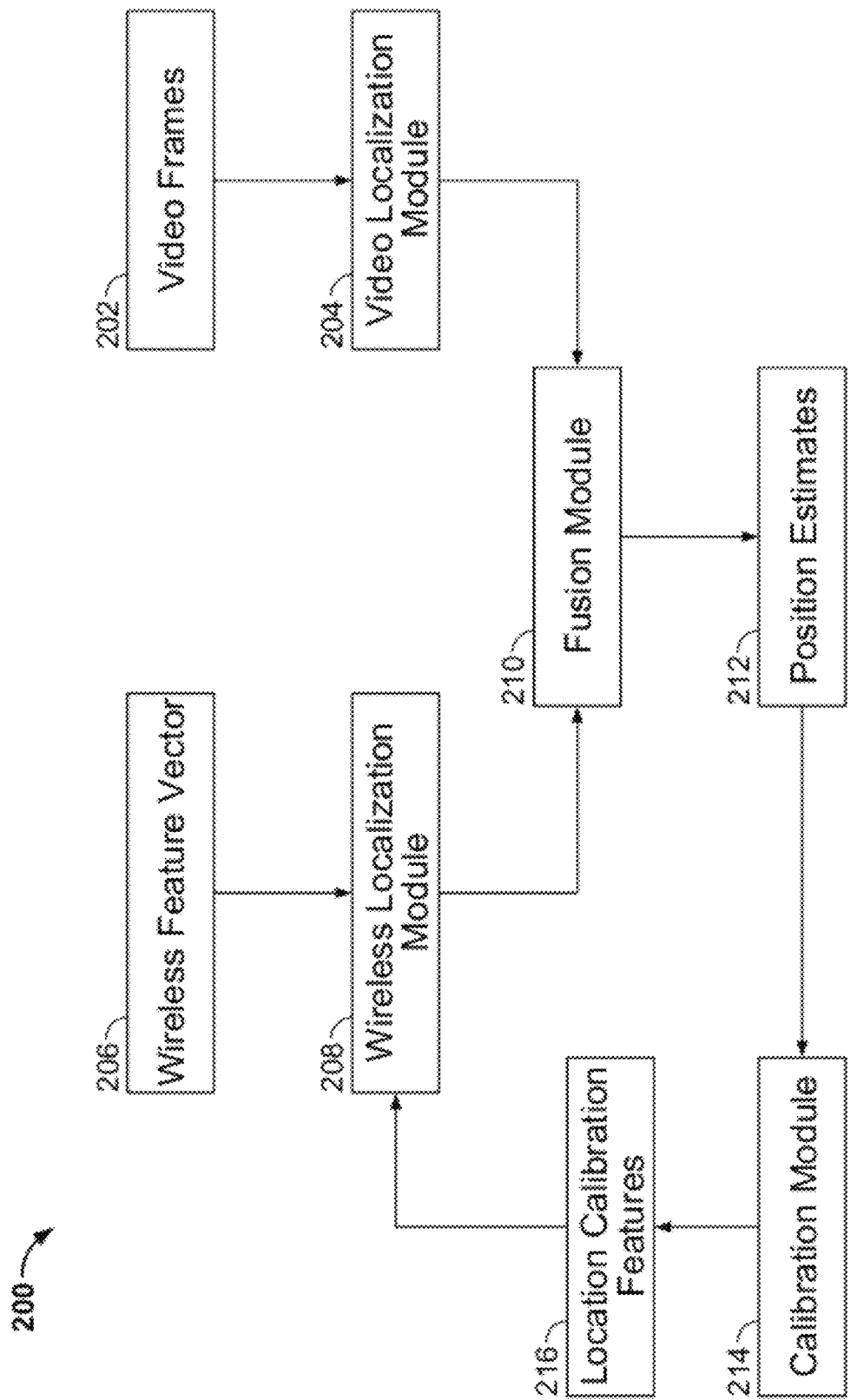
FIG. 2 illustrates an example of a Wi-Fi pattern matching localization system.

FIG. 2 illustrates an example of a Wi-Fi pattern matching localization system 200, according to some implementations. Video localization module 204 processes video frames 202 and generates video tracks and the probability of occupancy for positions with video coverage. Wireless localization module 208 estimates targets' positions through calculations comprising wireless feature vectors 2069 and occupancy probabilities received from the video localization module. Fusion module 210 estimates the positions of targets (position estimates 212) by combining target probabilities from wireless localization module 208 and occupancy probabilities from video localization module 204. Calibration module 214 updates the calibration data stored in the Wi-Fi location calibration database 216 with position estimates 212 generated by fusion module 210.

Figure 3:
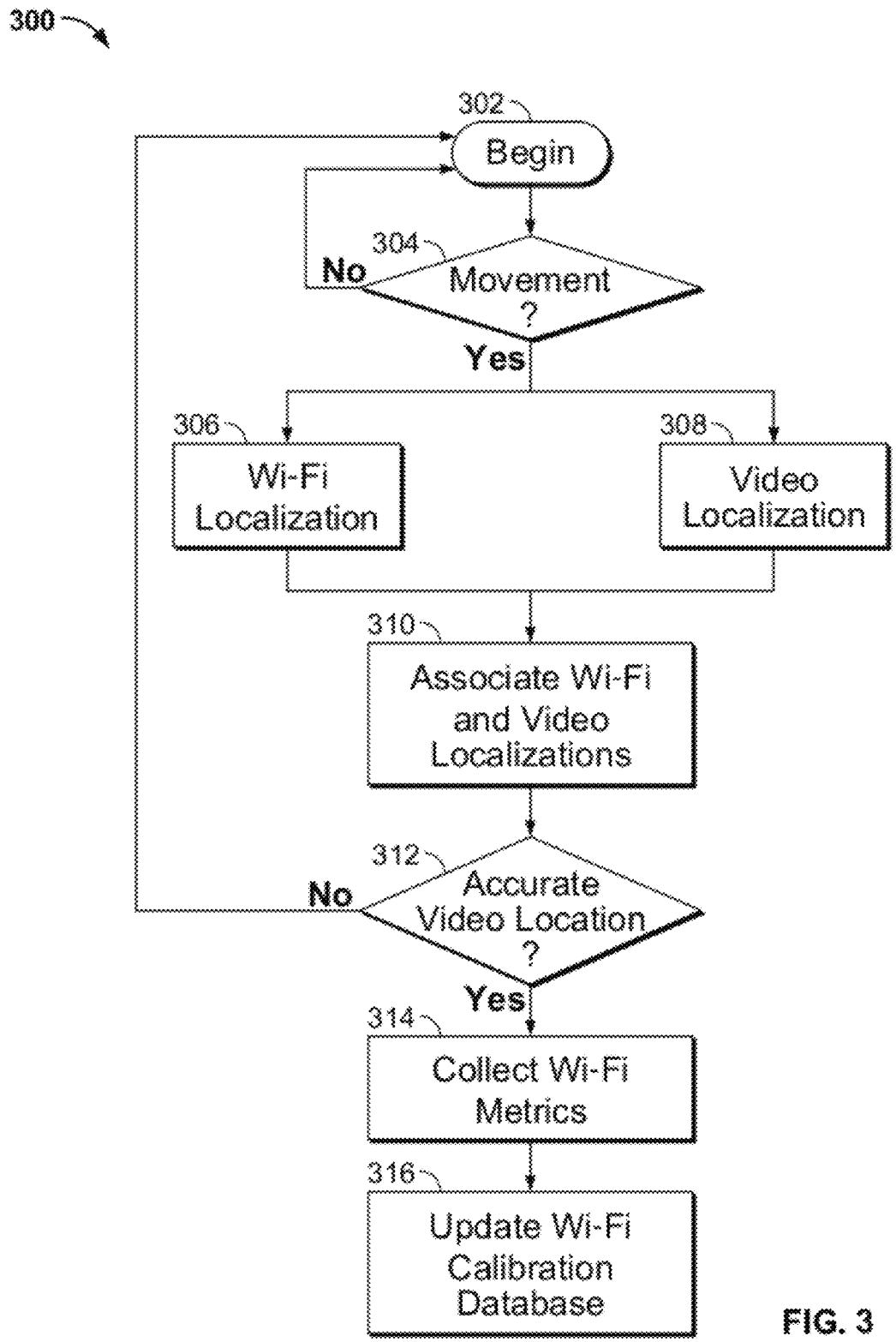
FIG. 3 illustrates a process for updating the Wi-Fi calibration database using video localization.

FIG. 3 illustrates a process 300 for updating the Wi-Fi calibration database using video localization. Process 300 can monitor movement (302) within an area covered by the localization system 200. If movement is detected (304), the movement can be tracked by both the Wi-Fi (306) and video localization subsystems (308). Next, the Wi-Fi and video tracks can be associated (310). For example, each object seen by the video cameras that has a Wi-Fi device can be associated to their respective video tracks and can be identified by the media access control (MAC) address of the Wi-Fi device. When there is high probability that the video localization is accurate (312), the Wi-Fi APs are queried to measure RSS, TDOA, or multipath signatures for the respective MAC address to form a feature vector (314). Finally, the Wi-Fi calibration database can be updated with the feature vector (316).

Wireless Localization Module

According to implementations, in the offline training phase, calibration data can be collected at each location $x^i$. For example, the signal strength measurements can be recorded at each location as observations. Given a set of Wi-Fi feature vector measurements, the most likely sequence of locations that led to the measurements can be determined.

A method is needed to find the probability of a target being located at each location across a grid. The probability, $p(x_t^i | p_w(x_{t-1}), z_w^t, \tau)$, of being at location $x^i$, at time t, can be calculated given the probability of being at all locations, x, at time t−1, a RSS measurement from N access points, and a transition probability $\tau$:

$$p(x_t^i | p_w(x_{t-1}), z_w^t, \tau), \qquad (1)$$

where i=1:L and L is the number of grid locations; $\tau_t$ is the transition probabilities at time t; $Z_t$ is the wireless RSS measurement vector.

$$p(x_t^i | z_w^t) \propto p(z_w^t | x_t^i) \tilde{p}(x_t^i) \qquad (2)$$

By making an independence assumption among signals from different AP's, we multiply all these probabilities to obtain the conditional probability of receiving a particular observation z at location $x^i$ as follows:

The likelihood of receiving feature vector $z_w$ at location $x^i$ is:

$$p(z_w^t \mid x_t^i) = \prod_{n=1}^{N} e^{-\frac{(z_{w,n}^t - h_{w,n}^{tx_i})^2}{\sigma_w^2}}, \quad (3)$$

where h is the wireless calibration vector for location $x^i$ and the $n^{th}$ AP.

The belief about the grid probabilities at time t based on the prior probabilities at time t−1 also know as the predicted prior is:

$$\tilde{p}(x_t^i) = p(x_t^i \mid x_{t-1}^i, \tau_t) = \Sigma_{j=1}^L x_{t-1}^j \tau_t^{i,j}, \quad (4)$$

where $\tau_t^{i,j}$ is the transition probability from location j to location i given that $$\Sigma_{j=1}^L \tau_t^{i,j} = 1, \quad (5)$$

and $$\text{if } \begin{matrix} i = (x_i, y_i) \\ j = (x_j, y_j) \end{matrix}, \quad \tau_t^{i,j} = \begin{cases} 0 & \text{if } |x_i - x_j| > 1 \text{ or } |y_i - y_j| > 1 \\ \eta^{i,j} & \text{otherwise} \end{cases} \quad (6)$$

where $\eta^{i,j} = p(x_{t+1}^i \mid x_t^i, v_t^i)$.

Video Localization Module

In some implementations, computer vision technology can be utilized to localize an object from a video in 2D space relative to a ground plane. The first step is to find the pixel in an image where the object touches the ground plane. Next this pixel's coordinates are transformed through a ground plane homography to coordinates on a floor plan.

Camera Calibration

In some implementations, each video camera can have its intrinsic and extrinsic parameters calibrated. The intrinsic parameters encompass the focal length, image format, principal point, and lens distortion of the camera. The extrinsic parameters denote the coordinate system transformations from camera coordinates to world coordinates. For example, the world coordinates can be relative to a building floor plan.

In some implementations, given a floor plan the extrinsic parameters can be extracted automatically. First, the system can determine where walls of the building meet the ground plane in a captured image. Then, the points in the image where the walls meet the ground plane can be fit to a floor plan to extract the extrinsic parameters.

Monocular Localization

In some implementations, monocular localization uses one camera on a scene in order to detect moving people or objects and, relative to a floor plan, report their locations. A sequence of foreground blobs can be created from image frames by separating the foreground from the background through foreground segmentation. With static cameras, foreground segmentation can be performed through background subtraction. Background subtraction involves calculating a reference image, subtracting each new frame from this image, and thresholding the result. The results of thresholding is a binary segmentation of the image which highlights regions of non-stationary objects. These highlighted regions are called "blobs".

Blobs can be a fragment of an object of interest or they may be two or more objects that are overlapping in the camera's field-of-view. Each of these blobs needs to be tracked and labeled to determine which are associated with objects. This labeling process can be complicated when blobs fragment into smaller blobs, blobs merging, or the object of interest entering or leaving the field-of-view. Blob appearance/disappearance and split/merge events caused by noise, reflections, and shadows can be analyzed to infer trajectories. Split and merge techniques can maintain tracking even when the background subtraction is suboptimal.

Tracking people or objects is further complicated when two or more objects overlap within the field-of-view causing an occlusions. Trajectory analysis techniques aim to maintain object tracking through these occlusions. Finally, it is desirable to recognize the object and determine what the object is or, in the case of people tracking, who the person is. Appearance based models used to identify a person or object can be CPU intensive and are far from robust. Implementations described herein solve the recognition problem associated with camera-based localization. In some implementations, when fusing the video trajectories with the Wi-Fi trajectories, the Wi-Fi MAC address can be used to identify the person carrying a Wi-Fi device or the object with a Wi-Fi tag.

Figure 4:
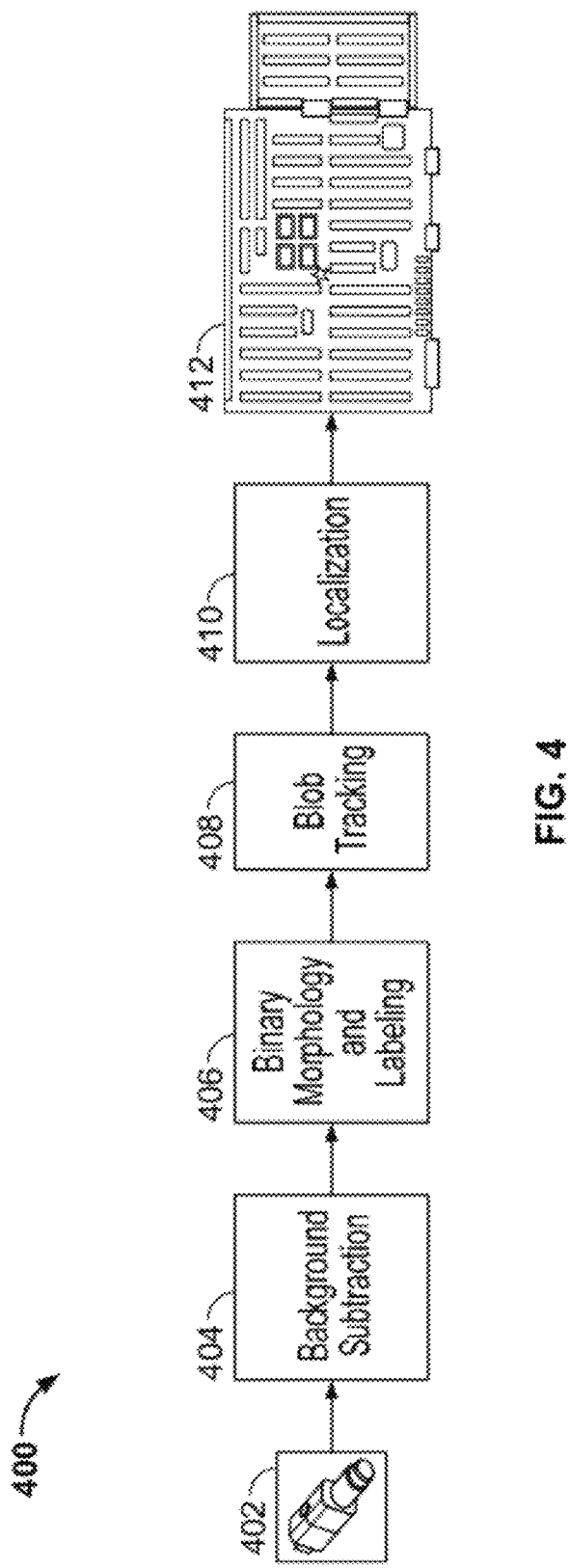
FIG. 4 is a block diagram of an example video localization subsystem.

FIG. 4 is a block diagram of an example video localization subsystem 400. The subsystem 400 can include camera 402, background subtraction 404, binary morphology and labeling 406, blob tracking 408, and localization components 410 for performing video localization within the floor plan 412 of a building.

Background Subtraction

Background subtraction component 404 can perform background subtraction on an image or images captured using camera 402. Segmentation by background subtraction is a useful technique for tracking objects that move frequently against a relatively static background. Although the background changes relatively slowly, it is usually not entirely static. Illumination changes and slight camera movements necessitate updating the background model over time. One approach is to build a simple statistical model for each of the pixels in the image frame. This model can be used to segment the current frame into background and foreground regions. For example, any pixel that does not fit the background model (e.g. for having a value too far from the mean) is assigned to the foreground. Models based on color features often suffer from an inability to separate a true foreground object from the object's shadow or reflection. To overcome this problem the gradient of the frame can be computed. For example, gradient features can be resilient against shadows and reflection.

Blob Tracking, Object Formation, and Occlusion Handling

Blob tracking component 408 can track blobs as they move in the foreground of an image. Ideally, background subtraction would produce one connected silhouette that completely covers pixels belonging to the foreground object. In practice, background subtraction may not work perfectly for all pixels. For example, moving pixels may go undetected due to partial occlusion or portions of the foreground whose appearance is similar to the background. For example, a foreground silhouette can be fragmented or multiple silhouettes can merge to temporarily create a single silhouette. As a result, blob tracks can be fragmented into components or merged with other tracks. The goal of blob tracking is to merge these fragmented track segments and create distinct, complete tracks for each object.

Video Localization

Video localization component 410 can determine the real world location of a target object. The localization process includes two steps. First, the piercing point of each tracked object can be found. The piercing point of an object is the pixel where the object meets the ground plane. For example, the piercing point of a human target is the center point of the target's shoes. The second step is to project the piercing point's pixel coordinates through a ground plane homography transformation. The result is the world coordinates of the target object, typically relative to a floor plan.

Occupancy Map

Figure 5:
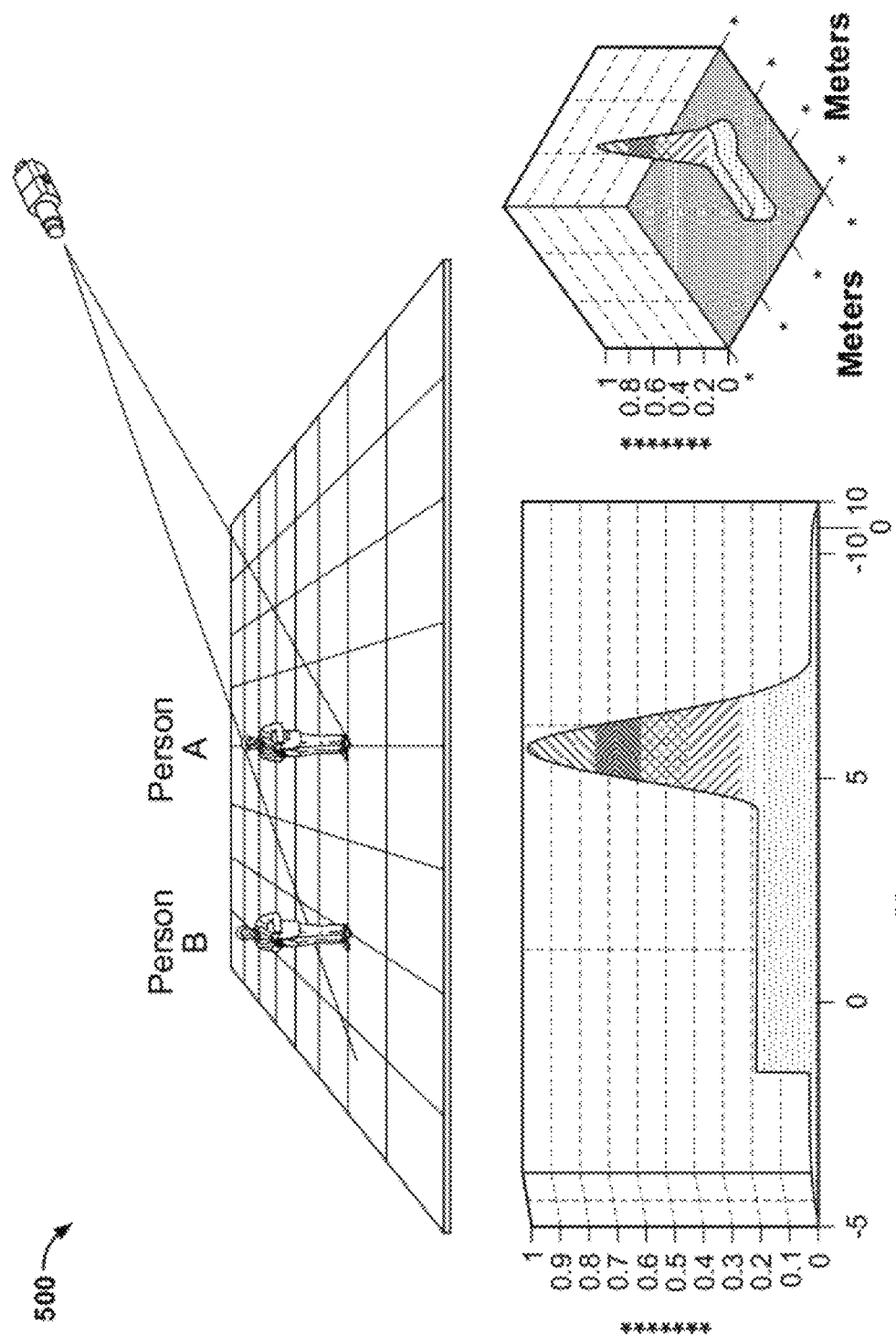
FIG. 5 illustrates an example occupancy map.

FIG. 5 illustrates an example occupancy map 500. The previous section detailed the video localization technology and steps to use video tracking to improve localization. Due to occlusions, it is difficult to maintain consistent track labels even with state-of-the-art technologies. In some implementations, the probability of occupancy can be modeled over a grid to improve localization. An occupancy map can store the probability of each grid cell being either occupied or empty.

In some implementations, the occupancy probability $p_v(x_t^i | I_t^C)$, can be estimated over locations $x_t^i$ given images $I_t^C$ from M cameras, at time t. For example, to find the position of a target, background subtraction, connected components, and blob tracking can be computed in order to find the target blobs' piercing points. A piercing point is the pixel where the blob touches the ground plane. By projecting the piercing point pixel through a ground plane homography, the target's location can be calculated. The probability $p_v(x_t^i | I_t^C)$ can be estimated as $p_v(x_t^i | B_t)$, where C: $\{c_1, c_2 \ldots c_m\}$ for M cameras and $B_t = \{b_t^1, b_t^2 \ldots b_t^M\}$ where $b_t^M$ is the vector of blobs from each camera image.

To calculate $p(x_t^i | b_{t,c}^P)$, occlusions that occur in crowded spaces can be modeled. For example, an occlusion is when one target crosses in front of another or goes behind any structure that blocks the camera's view of a target. This includes when one person closer to a camera blocks the camera's view of another person.

FIG. 5 illustrates a situation where person B cannot be distinguished from person A using a monocular camera blob tracker. The tracker cannot determine whether one or more people are occluded behind person A. This situation can be modeled probabilistically by a Gaussian distribution curve centered at the piercing point of the person closest to the camera and a uniform probability extending from the Gaussian distribution curve to the point where the blob's top pixel pierces the ground plane.

The instantaneous probability of occupancy at location $x^i$ is modeled as a Gaussian distribution centered at the blob's lower piercing point. The variance of the Gaussian distribution is proportional to the distance between $x^i$ and the camera location.

$$p(x_t^i | b_{t,c}^P) = e^{\frac{-\|x_t^i - location(b_{t,c}^P)\|^2}{\sigma_{b_{t,c}^P}^2}} \quad \text{and} \quad (7)$$

$$\sigma_{b_{t,c}^P} = \frac{|location(c) - location(b_{t,c}^P)|}{20} + 0.5 \quad (8)$$

Figure 6:
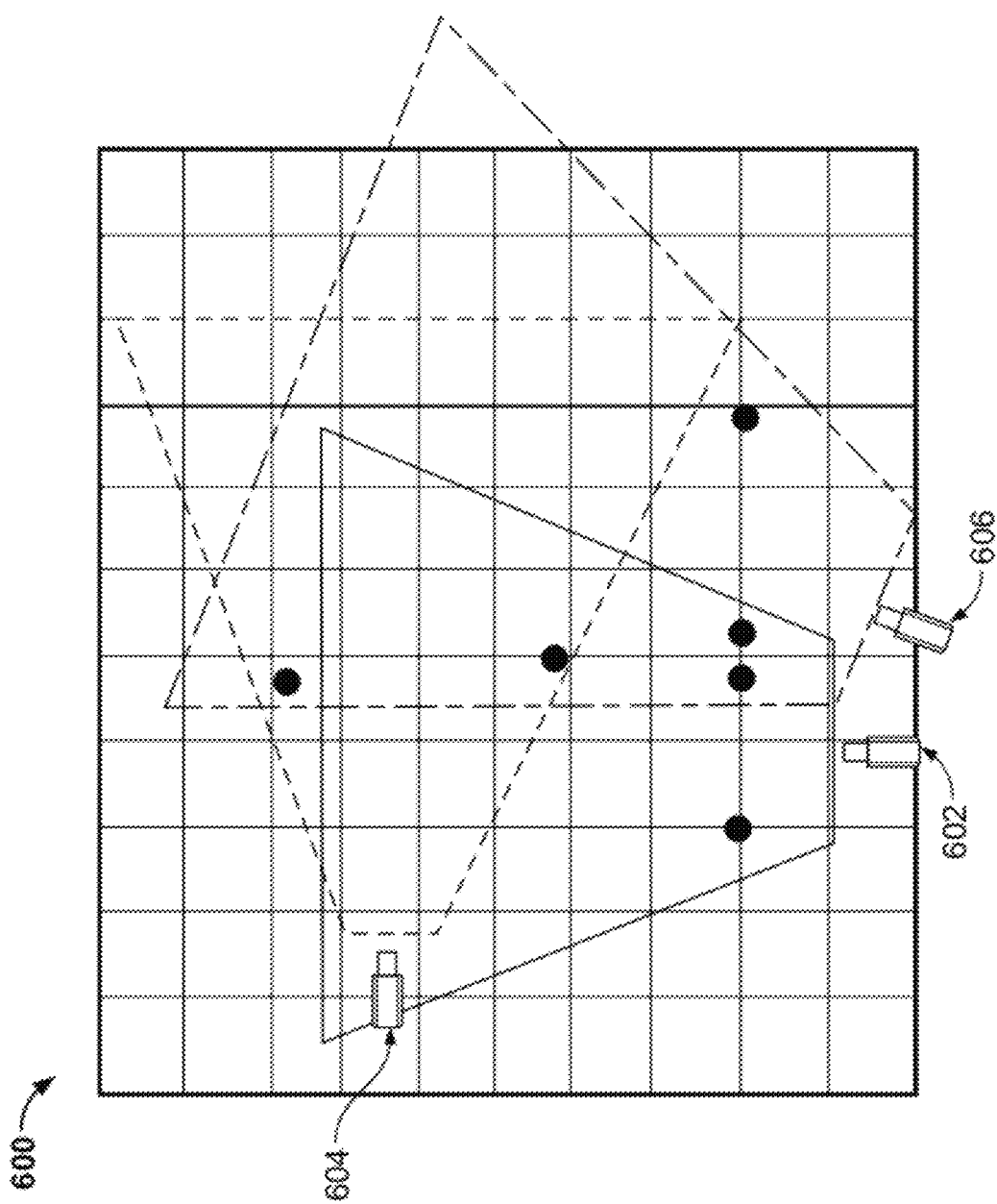
FIG. 6 illustrates an example of cameras having overlapping images.
Figure 7A:
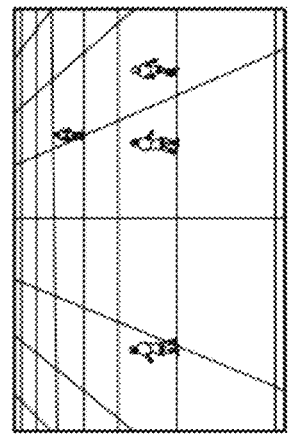
FIGS. 7A-7F illustrate an example of generating an occupancy grid based on images captured by overlapping cameras.
Figure 7B:
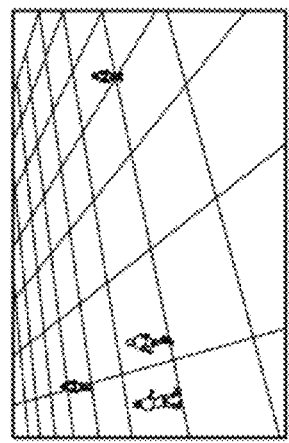
Figure 7C:
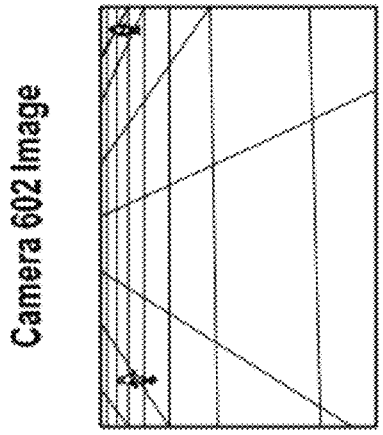
Figure 7D:
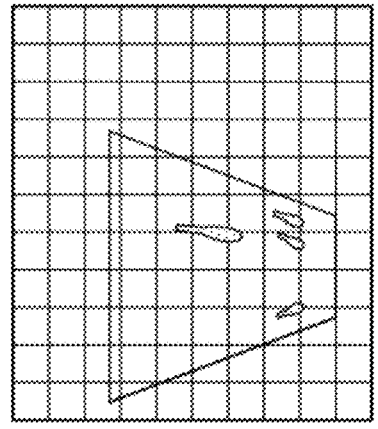
Figure 7E:
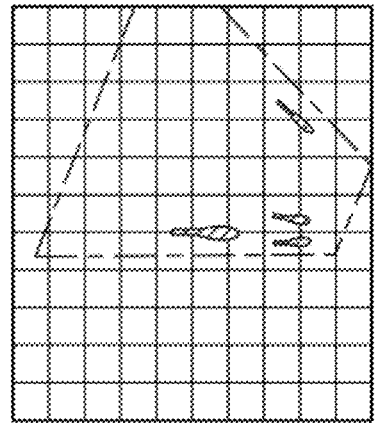
Figure 7F:
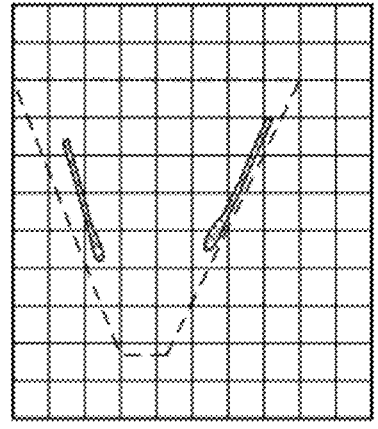

An example demonstrating the creation of an occupancy grid is illustrated in FIGS. 7A-7F. The camera images (FIGS. 7A-7C) show three cameras covering a scene with six people. The cameras have both overlapping and non-overlapping regions, as illustrated by FIG. 6. For example, the camera images of FIGS. 7A-7C can correspond to the images captured by cameras 602-606 of FIG. 6. FIGS. 7D-7F illustrate occupancy grids generated based on the images of FIGS. 7A-7C.

Figure 8:
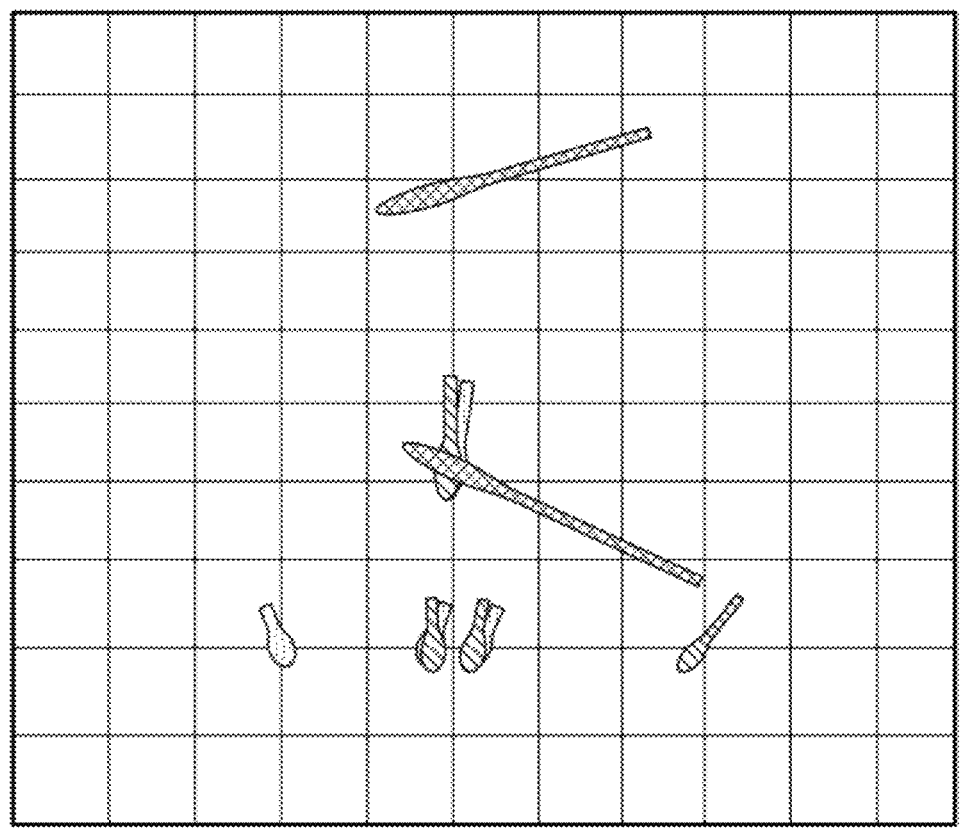
FIG. 8 illustrates a combined occupancy grid based on images captured by overlapping cameras.

In some implementations, multiple blobs across multiple cameras can be fused together using the following equation:

$$p_v(x_t^i | B_t) = \max_{c=1:M} \left( \max_{p=1:Q_C} (p(x_t^i | b_{t,c}^P)) \right), \quad (9)$$

where $Q_C$ is the number of blobs in camera C at time t. Other methods to combine multiple occupancy grids include the summation or product of occupancy probability grids from different cameras. FIG. 8 illustrates an example combined occupancy grid 800 generated by combining the occupancy maps of FIGS. 7D-7F.

In an implementation, Bayesian filtering can be used to compute a posterior occupancy probability conditioned on the instantaneous occupancy probability measurement and velocity measured for each grid location. A prediction step can be used to compute a predicted prior distribution for the Bayesian filter. For example, the state of the system is given by the occupancy probability and velocity for each grid cell. The estimate of the posterior occupancy grid will include the velocity estimation in the prediction step. For each grid cell in the Bayesian occupancy filter, the set of velocities that brings a set of corresponding grid cells in the previous time step to the current grid are considered. The resulting distribution on the velocity of the current grid cell is updated by conditioning on the incoming velocities with respect to the current grid cell and on the measurements from the cameras.

Improving Occupancy Models with Architectural Constraints

The probability of occupancy models can be improved by measuring the height of the blobs. For example, ground plane homography as well as a homography at head level can be performed. Choosing the head level homography height as the average human height, 5'9", a blob can be declared short, average, or tall. For example, a failure in the background subtraction might result in a person's pants not being detected resulting in a short blob. A tall example results when two people aligned coaxially with the camera form one blob in the camera's field-of-view. The height of each blob is one piece of information that is used to improve the probability occupancy models, as described further below.

The architecture of the space seen by the camera also can be used to improve the probability occupancy models. For example, a wall or shelf can constrain the occupancy probability to one side of the wall or shelf. Likewise, observing a person within an aisle can constrain them to that aisle. The probability model can be selected based on the type of space and the blob's relative height. For example, the probability model can be selected based on whether the blob is tall or short. The probability model can be selected based on whether the blob is in open space, partially obscured behind a wall, or between walls. The probability model can be selected based on the heights of different objects proximate to the detected blobs.

Human Detection

For applications tracking human or other objects with specific appearance, computer vision detection methods can be used to help resolve occlusions. One method is histogram of gradient feature extraction used in conjunction with a classifier such as a support vector machine. The speed of these methods can be improved by performing detection only over the blobs from background subtraction rather than the entire frame. Detectors improve the occupancy map by replacing uniform probabilities over the region of an occlusion with Gaussians distributions at specific locations.

Shadows can be problematic for background subtraction as they can often be seen as part of the foreground and are difficult to remove due to their movement being correlated with the target. Shadows may corrupt the position calculations dramatically for low elevation cameras. Appearance-based detection algorithms can be useful in finding legs and feet without being corrupted by shadows.

Depth Cameras

Creating an occupancy map from a depth camera such as a stereo camera is simpler than using a monocular camera. Monocular cameras suffer from occlusion ambiguity. The depth camera may resolve this ambiguity. For each pixel a depth camera reports the distance of that pixel from the camera. In one embodiment of this disclosure, the occupancy map can be created from depth camera measurements, with each detection modeled as a 2D Gaussian.

In conclusion, probability occupancy models have advantages including providing a probabilistic approach to occlusion handling, easily combining multiple cameras, and computational efficiency.

Multi-View Geometry

In some implementations, if a target is in the field-of-view of two monocular cameras, those two camera views can be used to compute the 3D coordinate of the target. For example, similar to a stereo camera, multi-view geometry uses two or more cameras to compute a distance to the target using epipolar geometry.

Traditionally, multi-view or stereo systems are very computationally expensive. The calculations can be simplified, however, with a few assumptions. For example, three steps are required for computing an epipolar geometry. First, corresponding points must be found between the images. Second, the camera view may be rectified. Finally, a transformation to the world coordinate system is performed. To address these three performance concerns, an assumption can be made that the top of the head of a blob is the correspondence point without trying to achieve pixel-level accuracy. Next, the rectification and transformation processes are only performed for one pixel to calculate one 3D coordinate.

Fusion Module

The Wi-Fi likelihood and vision probability of occupancy are fused together using Bayesian inference to advance the target location through time.

$$p(x_t^i|I_t, z_{w_t}, x_{t-1}) \propto p(x_t^i|I_t^C) p(x_t^i|z_{w_t}) p(\tilde{x}_t^i|x_{t-1}^i) \qquad (10)$$

The probability of the target's position being at $x^i$ given images from each camera, the target's wireless measurement, and the previous grid probabilities equals the product of the vision grid probabilities, Wi-Fi grid probabilities, and predicted prior grid probabilities. The target's position is the state estimate of the system and may be computed in many ways: as the expectation over the grid, the maximum probability across the grid, or as the average across the k-largest probability cells. In one embodiment the state estimate's velocity is used to predict the current grid probabilities based on the prior probabilities to form a predicted prior grid.

Calibration Module

In some implementations, a calibration module (e.g., calibration module 214 of FIG. 2) can record unlabeled wireless feature vectors, label them with assistance from the video system to provide an accurate location label, and update the radio map of feature vectors stored in a database (e.g., database 216). In some implementations, the calibration module can track associations between the wireless and video locations to determine correspondence between a wireless device and a blob from the video localization module. In some implementations, the calibration module can use the location estimation determined by the fusion module. In some implementations, the calibration module can store sequences of wireless features and video tracks or occupancy maps for offline computation and update of the calibration database.

Wi-Fi and Video Track Association Labeling

According to implementations, in order to take advantage of the video localization system's accuracy, each of the persons or objects seen by the video camera network can be associated with one of the many Wi-Fi devices reported by the Wi-Fi network. To accomplish this association, the trajectories of Wi-Fi devices and the trajectories from the video camera network can be spatio-temporally correlated. A trajectory is the path a moving object takes through space over time. Using the parlance of multiple target tracking, each of these trajectories is a track. During the spatio-temporal correlation, each Wi-Fi track can be correlated with each video track in order to determine how similar each pair of trajectories are. This process relies on the fact that one object's location, measured two different ways, even when the measurements have different observation error statistics, should move coherently through time.

The first step is to define a similarity measure between two tracks. For example, a similarity measure can include $L_p$ norms, time warping, longest common subsequence (LCSS), or deformable Markov model templates, among others. In some implementations, the $L_2$ norm can be used as a similarity measure. The $L_p$ norm is defined as $$L_p(v,w) = (\Sigma_{i=1} |v_i - w_i|^p)^{1/p}, \qquad (11)$$

where v is a vector of the (x,y) position from the video localization and w is a vector of the (x,y) position from the Wi-Fi localization. For the Euclidean norm, p equals two. The Euclidean norm can be used to find the similarity between the track v and the track w over a time series of data. For a real-time system, it may be necessary to have an iterative algorithm that will update the similarity between tracks at every time sample without needing to store the entire track history, as described below and framed as a Bayesian inference graph.

For the Bayesian framework, the similarity metric should be modeled as a probability. To do so, the statistics of the camera and Wi-Fi measurements can be learned. The precision of the localization from the video subsystem will depend on the number of cameras that have a view of the tracked object, the number of people clustered close together, the cameras' perspective, the ability to separate foreground from background, and the distance of the object from each camera, among other things. Furthermore, the video system's X and Y position statistics will depend on each camera's field of view relative to the ground plane homography. Calculating the correct camera location precision statistics is hard to compute. It is easier to compute the statistics of the distance discrepancy between the camera and Wi-Fi measurements and not worry about the absolute position statistics.

Two dimensional Gaussian statistics are modeled because both the camera and Wi-Fi location precision statistics will be different in 2D space. For a 2D location system, the Gaussian function is:

$$N(l \mid \mu, \Sigma) = \frac{1}{2\pi} \cdot \frac{a}{|\Sigma|^{1/2}} \cdot e^{-1/2(l-\mu)^T \Sigma^{-1}(l-\mu)}, \quad (12)$$

$$\text{where } 1 = \begin{bmatrix} (x_c - x_w) \\ (y_c - y_w) \end{bmatrix}, \quad \mu = \begin{bmatrix} \mu_x \\ \mu_y \end{bmatrix}, \quad \Sigma = \begin{bmatrix} \sigma_x^2 & \sigma_{xy}^2 \\ \sigma_{yx}^2 & \sigma_x^2 \end{bmatrix}$$

In equation (12), $x_c, y_c$ is the position measured from the video subsystem and $x_w, y_w$ is the position measured from the Wi-Fi subsystem. Given a data set $L=[l_1 \ldots, l_N]T$, representing N Wi-Fi measurements and assuming i.i.d., the joint probability is the product of the marginal probabilities of each event. The maximum likelihood solution for $\mu, \Sigma$ is:

$$\mu_{ML} = \frac{1}{N} \sum_{n=1}^{N} l_n \quad (13)$$

$$\Sigma_{ML} = \frac{1}{N} \sum_{n=1}^{N} (l_n - \mu_{ML})(l_n - \mu_{ML})^T \quad (14)$$

To be implemented in real time, an iterative solution is needed:

$$\mu^{(N)} = \mu^{(N-1)} + \frac{1}{N}(l_n - \mu_{ML}^{(N-1)}) \quad (15)$$

and $$\Sigma_{ML}^{(N)} = \Sigma_{ML}^{(N-1)} + \frac{1}{N}[(l_N - \mu_{ML})(l_n - \mu_{ML})^T - \Sigma_{ML}^{(N-1)}] \quad (16)$$

Given the statistics, the instantaneous probability of two tracks being associated is given by $N(1|\mu, \Sigma)$ multiplied by the area of one map grid square.

Bayesian inference is used to estimate the probability of track association using temporal information. With each new measurement the probability of each Wi-Fi and video track pair is updated as follows:

$$p(c \mid d) = \frac{p(d \mid c) \cdot p(c)}{p(d)}, \quad (17)$$

where c represents the difference classes we are classifying the measurements to; d is the error vector distance between the camera measurement and the Wi-Fi measurement; p(c|d) is the posterior probability that the camera track and the Wi-Fi track are associated given the new Wi-Fi measurement error vector; p(c) is the prior probability that the camera track and Wi-Fi track are associated; p(d|c) is the probability of the Wi-Fi measurement error vector given its distance from the camera track position; and p(d)=sum(d|c)*p(c) over all c.

Figure 9B:
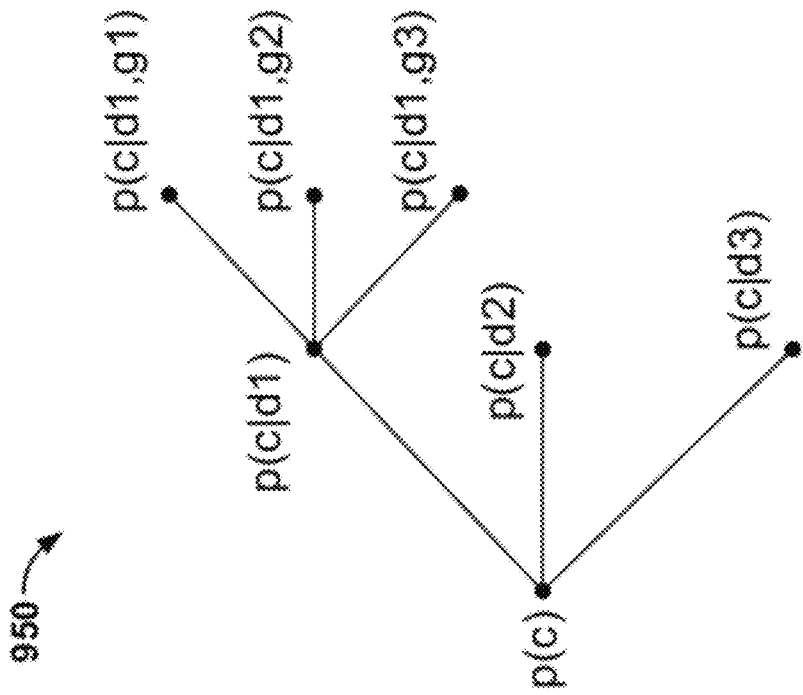
FIG. 9B illustrates an example inference graph where a Wi-Fi system reports a probability associated with each map grid.
Figure 9A:
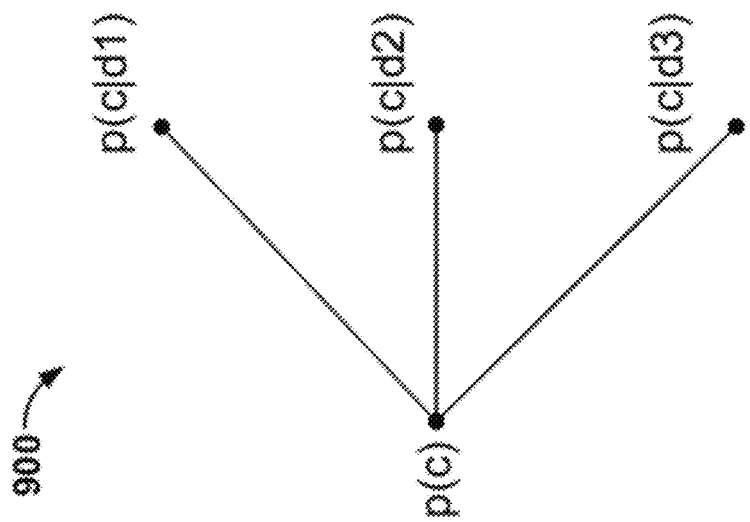
FIG. 9A illustrates an example inference graph for one video track.

FIG. 9A illustrates an example inference graph 900 for one video track. For example, the leaves of graph 900 are the probability that a Wi-Fi device is associated with a particular camera track given a new observation. The top leaf, p(c|d1), is the probability that Wi-Fi device, with error vector d1, is associated with this camera track given the new error vector d1. FIG. 9B illustrates an example inference graph 950 where the Wi-Fi system reports a probability associated with each map grid. In graph 950, the top leaf, p(c|d1,g1), is the probability that Wi-Fi device, with error vector d1, is associated with this camera track given the new error vector d1 at grid map g1. This framework allows new measurements to iteratively improve the association probability estimates.

Bayesian Fusion Example

Figure 10A:
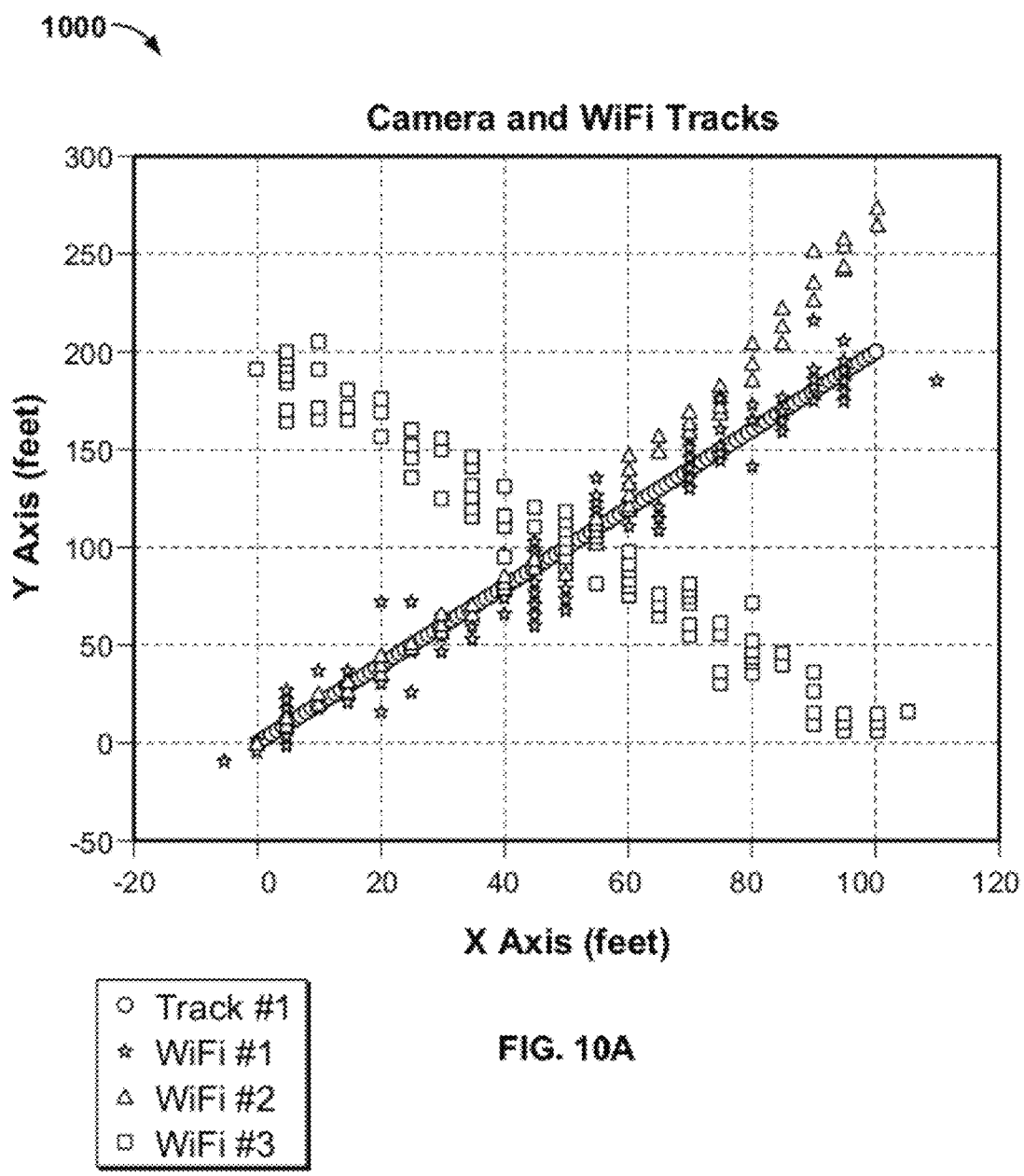
FIG. 10A illustrates an example graph for comparing camera and Wi-Fi tracks.

FIG. 10A illustrates an example graph 1000 for comparing camera and Wi-Fi tracks. The circles are the trajectory measured by video localization. The stars, triangles, and squares are three tracks measured by the Wi-Fi localization system. The measurements can be used to determine which of the Wi-Fi tracks has the most spatio-temporal probability of being associated with the video track.

Figure 10B:
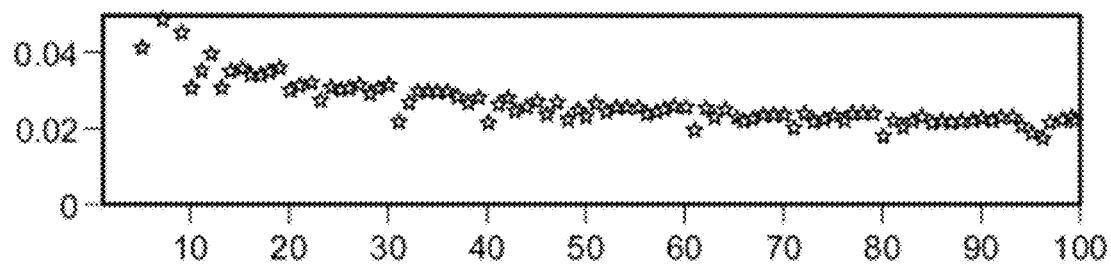
FIGS. 10B-10D illustrate example graphs showing the instantaneous spatial probability of the three Wi-Fi tracks being associated with the video track shown in FIG. 10A.
Figure 10C:
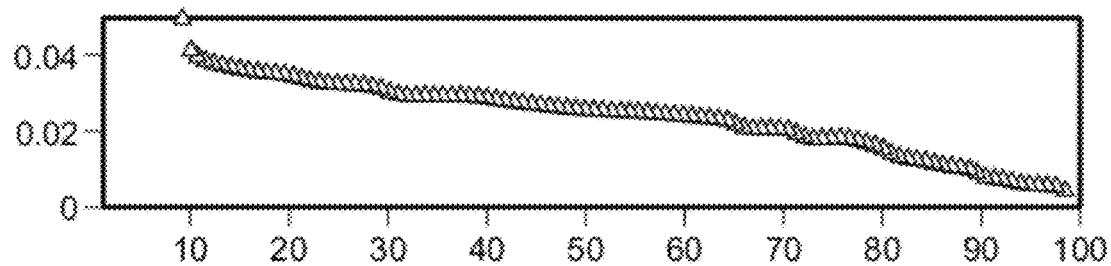
Figure 10D:
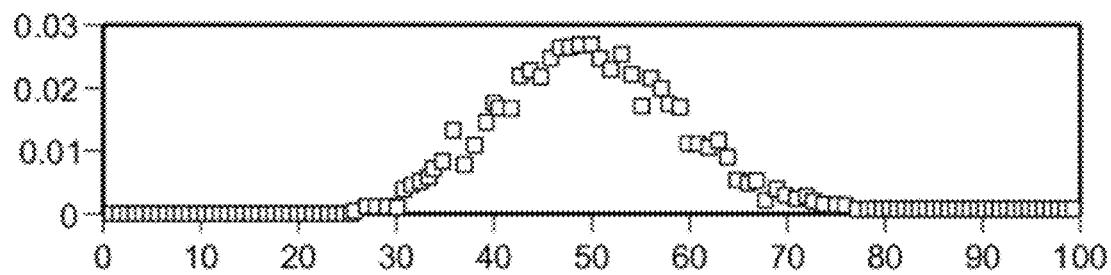
Figure 10E:
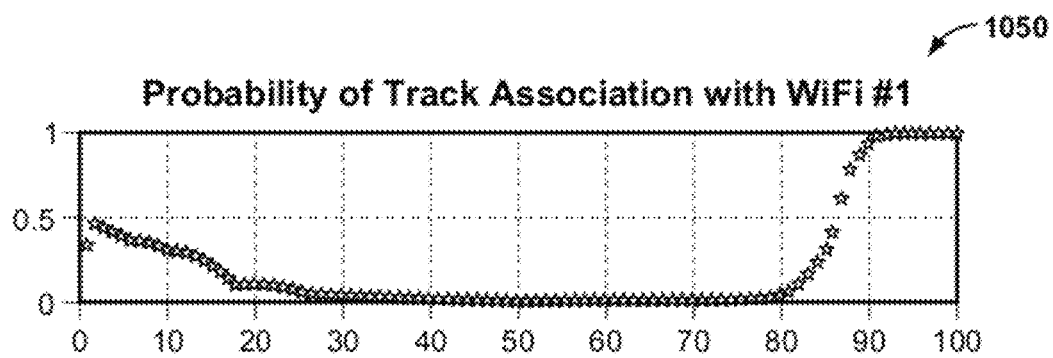
FIGS. 10E-10G illustrate example graphs showing the spatial-temporal probability of the three Wi-Fi tracks being associated with the video track.
Figure 10F:
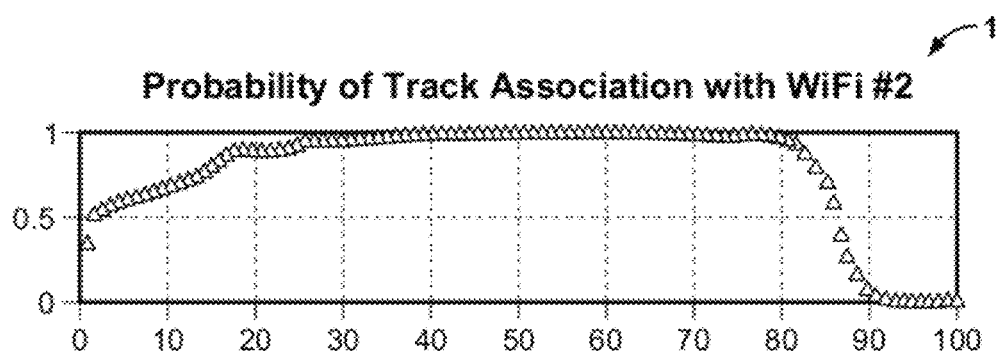
Figure 10G:
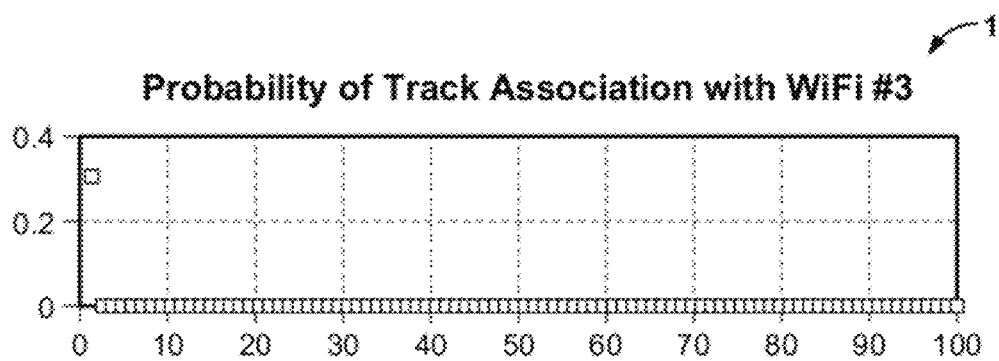

FIGS. 10B-10D illustrate example graphs 1020, 1030 and 1040 showing the instantaneous spatial probability of the three Wi-Fi tracks being associated with the video track, circles shown in FIG. 10A. FIGS. 10E-10G illustrate example graphs 1050-1080 showing the spatial-temporal probability of the three Wi-Fi tracks being associated with the video track. For example, the Wi-Fi track shown in graph 1050 is statistically most likely to be associated with the video track shown in graph 1000.

Fusion Module Labeling

Another method of calibration simply uses the output from the fusion module to label the wireless feature vectors' location.

Sequence Storage for Offline Computation

The position estimate generated by the fusion module is generated by first-order Markov localization. Hidden Markov models (HMMs) and stochastic grammars are generative models, assigning a joint probability to paired observation and label sequences. The target's position, x, is a hidden state and the feature vectors, z, are the observable states. Although HMMs provide an elegant and sound methodology, they suffer from one principal drawback: The structure of the HMM is often a poor model of the true process producing the data. Part of the problem stems from the Markov property. Any relationship between two separated z values (e.g., $z_1$ and $z_9$) must be communicated via the intervening x's. A first-order Markov model (i.e., where $P(x_t)$ only depends on $x_{t-1}$) cannot in general capture these kinds of relationships.

This problem is exacerbated by the nature of pattern matching based localization due to two factors. First, the radio map is not a complete representation of the RF environment. RF propagation is complex and small-scale effects are numerous and difficult to capture. Second, the RF environment is dynamic and the radio map changes over time. The result is an incomplete calibration model or radio map. Therefore, during online localization often measurements are observed that do not match the calibrated radio map. Using a first order Markov chain with a transition matrix describing spatial connectedness will result in position estimate errors and corrective jumps. These corrective jumps make online calibration with unlabeled data difficult.

In some implementations, an entire sequence of wireless feature vector and video track and/or occupancy map data can be stored over a larger time segment. Offline computation can be performed to analyze this data and find the most likely location labels over the entire sequence. Thus, each feature vector can be labeled with the benefit of both past and future data.

In some implementations, to define a joint probability over observation and label sequences, a generative model can enumerate all possible observation sequences. In particular, it may not practical to represent multiple interacting features or long-range dependencies of the observations, since the inference problem for such models is intractable.

Sliding window methods avoid this difficulty by using a window of $x_t$ values to predict a single $x_t$. However, the second problem with the HMM model is that it generates each $z_t$ only from the corresponding $x_t$. This can make it difficult to use a sliding window. Conditional random fields (CRFs) can be used to overcome these difficulties. For example, conditional random fields allow the probability of a transition between labels to depend not only on the current observation, but also on past and future observations. These calculations can be improved using client data such as accelerometer, gyroscope, and magnetometer, if available.

Calibration by Robot

In some implementations, manual calibration may be required. For example, a person can walk through every point on the map grid while holding a transmitting Wi-Fi client. The access points or sensors can record the signals received and label the measurements with the position of the person with the Wi-Fi device. In some implementations, a robot can be used to move the transmitting Wi-Fi client through the points on the map grid.

There are three reasons manual calibration might be desired. First, a space may not have complete video coverage. Some sections of the facility might not require high accuracy localization or might not otherwise be a good fit for video camera coverage. These areas can be calibrated manually. Second, sparse calibration data is required to bootstrap the video calibration. Third, an accurate map of the space may not be available. For example, often architectural or CAD drawings do not exactly match the current space as aisles or shelving have moved.

Simultaneous localization and mapping (SLAM) is the problem of building a map while at the same time localizing the robot within that map (www.openslam.org). Using a SLAM robot for calibration automates the manual task of walking a grid of locations with a transmitting Wi-Fi client. The robots ability to locate itself provides the position labels for the measured wireless feature vectors. Furthermore, the SLAM robot can produce an up-to-date map.

The camera calibration is a manual process that can be automated by the robot. As the robot traverses the space, it can report its location. These location reports form a feedback loop that is used to label pixels with 3D positions. Homography calibration routines require a minimum of four pixel/location pairs to perform extrinsic calibration. The fundamental matrix for epipolar calculations requires eight pixel/location pairs for calibration.

Example System Architecture

Figure 11:
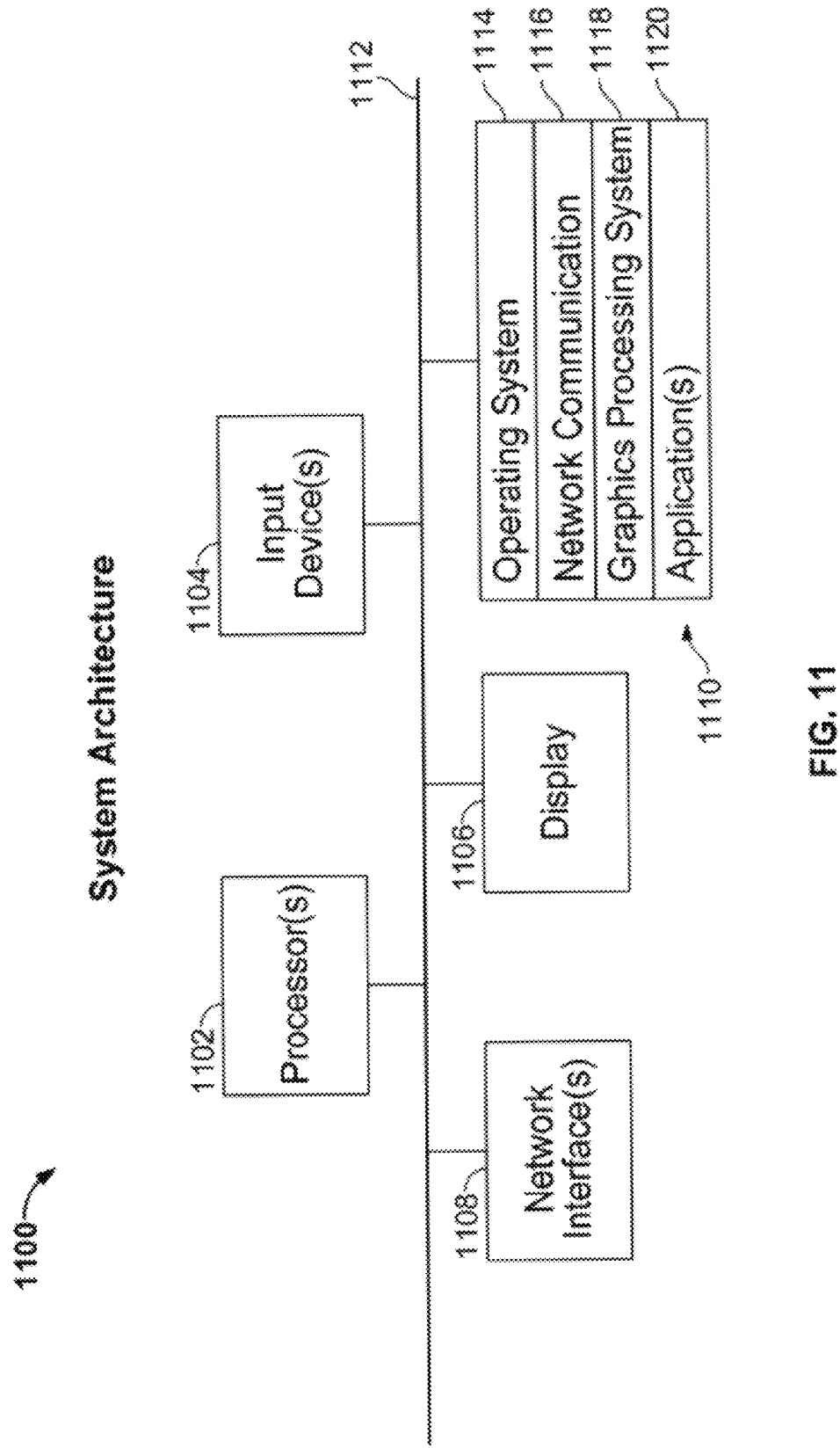
FIG. 11 is a block diagram of an example system architecture implementing the features and processes of FIGS. 1-10G.

FIG. 11 is a block diagram of an example system architecture implementing the features and processes of FIGS. 1-10G. The architecture 1100 can be implemented on any electronic device that runs software applications derived from compiled instructions, including without limitation personal computers, servers, smart phones, media players, electronic tablets, game consoles, email devices, etc. In some implementations, the architecture 1100 can include one or more processors 1102, one or more input devices 1104, one or more display devices 1106, one or more network interfaces 1108 and one or more computer-readable mediums 1110. Each of these components can be coupled by bus 1112.

Display device 1106 can be any known display technology, including but not limited to display devices using Liquid Crystal Display (LCD) or Light Emitting Diode (LED) technology. Processor(s) 1102 can use any known processor technology, including but are not limited to graphics processors and multi-core processors. Input device 1104 can be any known input device technology, including but not limited to a keyboard (including a virtual keyboard), mouse, track ball, and touch-sensitive pad or display. Bus 1112 can be any known internal or external bus technology, including but not limited to ISA, EISA, PCI, PCI Express, NuBus, USB, Serial ATA or FireWire. Computer-readable medium 1110 can be any medium that participates in providing instructions to processor(s) 1102 for execution, including without limitation, non-volatile storage media (e.g., optical disks, magnetic disks, flash drives, etc.) or volatile media (e.g., SDRAM, ROM, etc.).

Computer-readable medium 1110 can include various instructions 1114 for implementing an operating system (e.g., Mac OS®, Windows®, Linux). The operating system can be multi-user, multiprocessing, multitasking, multithreading, real-time and the like. The operating system performs basic tasks, including but not limited to: recognizing input from input device 1104; sending output to display device 1106; keeping track of files and directories on computer-readable medium 1110; controlling peripheral devices (e.g., disk drives, printers, etc.) which can be controlled directly or through an I/O controller; and managing traffic on bus 1112. Network communications instructions 1116 can establish and maintain network connections (e.g., software for implementing communication protocols, such as TCP/IP, HTTP, Ethernet, etc.).

A graphics processing system 1118 can include instructions that provide graphics and image processing capabilities. For example, the graphics processing system 1118 can implement the processes described with reference to FIGS. 1-10G. Application(s) 1120 can be an application that uses or implements the processes described in reference to FIGS. 1-10G. The processes can also be implemented in operating system 1114.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, other steps may be provided, or steps may be eliminated, from the described flows, and other components may be added to, or removed from, the described systems. Accordingly, other implementations are within the scope of the following claims.

What is claimed is:

1. A method comprising:
   obtaining, from a transmitter associated with a movable target, wireless signal pattern data at a plurality of access points corresponding to a plurality of fixed locations, the wireless signal pattern data including a signal strength measured by the plurality of access points at the plurality of fixed locations;
   determining a wireless feature vector associated with the movable target, the wireless feature vector being determined based on the wireless signal pattern data;
   obtaining video data associated with the movable target;
   calculating occupancy probabilities of the movable target based on the video data;
   estimating a location of the movable target based on the wireless feature vector and the occupancy probabilities; and
   updating calibration data for the plurality of access points corresponding to the plurality of fixed locations based on the estimated location of the movable target.

2. The method of claim 1, wherein obtaining the wireless signal pattern data is based on receiving wireless signals.

3. The method of claim 1,
   wherein the calibration data is further updated based on the wireless signal feature vector.

4. The method of claim 1, wherein estimating the location of the movable target further comprises:
   determining a first location of an object based on the video data;
   determining a second location of the transmitter based on the wireless signal pattern data obtained from the transmitter; and
   determining, based on the first location and the second location, that the object corresponds to the transmitter.

5. The method of claim 1, wherein estimating the location of the movable target further comprises:
   tracking movement of an object along a first path based on the video data;
   tracking movement of the transmitter along a second path based on the wireless signal pattern data; and
   determining, based on the first path and the second path, that the object corresponds to the transmitter.

6. The method of claim 1, wherein estimating the location of the movable target further comprises:
   receiving video data from a plurality of cameras having overlapping fields of view, the video data including video of an object in the overlapping fields of view; and determining a three-dimensional position of the object based on the video data received from the plurality of cameras.

7. The method of claim 1, wherein the wireless signal pattern data identifies each of the plurality of fixed locations.

8. A system comprising:
one or more processors; and
a computer-readable medium including one or more sequences of instructions which, when executed by the one or more processors, causes:
obtaining, from a transmitter associated with a movable target, wireless signal pattern data at a plurality of access points corresponding to a plurality of fixed locations from a transmitter associated with a movable target, the wireless signal pattern data including a signal strength measured by the plurality of access points at the plurality of fixed locations;
determining a wireless feature vector associated with the movable target, the wireless feature vector being determined based on the wireless signal pattern data;
obtaining video data associated with the movable target;
determining occupancy probabilities of the movable target based on the video data;
estimating a location of the movable target based on the wireless feature vector and the occupancy probabilities; and
updating calibration data for the plurality of access points corresponding to the plurality of fixed locations based on the estimated location of the movable target.

9. The system of claim 8, wherein the instructions for obtaining the wireless signal pattern data is based on receiving wireless signals.

10. The system of claim 8, wherein
the calibration data is further updated based on the wireless signal feature vector.

11. The system of claim 8, wherein the instructions that cause estimating the location of the target further comprise instructions that cause:
determining a first location of an object based on the video data;
determining a second location of the transmitter based on the wireless signal pattern data obtained from the transmitter; and
determining, based on the first location and the second location, that the object corresponds to the transmitter.

12. The system of claim 8, wherein the instructions that cause estimating the location of the movable target further comprise instructions that cause:
tracking movement of an object along a first path based on the video data;
tracking movement of the transmitter along a second path based on the wireless signal pattern data; and
determining, based on the first path and the second path, that the object corresponds to the transmitter.

13. The system of claim 8, wherein the instructions that cause estimating the location of the movable target further comprise instructions that cause:
receiving video data from a plurality of cameras having overlapping fields of view, the video data including video of an object in the overlapping fields of view; and
determining a three-dimensional position of the object based on the video data received from the plurality of cameras.

14. The system of claim 8, wherein the wireless signal pattern data identifies each of the plurality of fixed locations.

15. A non-transitory computer-readable medium including one or more sequences of instructions which, when executed by one or more processors, causes:
obtaining, from a transmitter associated with a movable target, wireless signal pattern data at a plurality of access points corresponding to a plurality of fixed locations, the wireless signal pattern data including a signal strength measured by the plurality of access points at the plurality of fixed locations;
determining a wireless feature vector associated with the movable target, the wireless feature vector being determined based on the wireless signal pattern data;
obtaining video data associated with the movable target;
calculating occupancy probabilities of the movable target based on the video data;
estimating a location of the movable target based on the wireless feature vector and the occupancy probabilities; and
updating calibration data for the plurality of access points corresponding to the plurality of fixed locations based on the estimated location of the movable target.

16. The non-transitory computer-readable medium of claim 15, wherein the instructions for obtaining the wireless signal pattern data is based on receiving wireless signals.

17. The non-transitory computer-readable medium of claim 15, wherein the instructions further cause:
updating the wireless signal pattern data based on the wireless signal feature vector.

18. The non-transitory computer-readable medium of claim 15, wherein the instructions that cause estimating the location of the movable target comprise instructions that cause:
determining a first location of an object based on the video data;
determining a second location of the wireless transmitter based on the wireless signals received from the wireless transmitter; and
determining, based on the first location and the second location, that the object corresponds to the wireless transmitter.

19. The non-transitory computer-readable medium of claim 15, wherein the instructions that cause estimating the location of the movable target comprise instructions that cause:
tracking movement of an object along a first path based on the video data;
tracking movement of the wireless transmitter along a second path based on the wireless signals received from the wireless transmitter; and
determining, based on the first path and the second path, that the object corresponds to the wireless transmitter.

20. The non-transitory computer-readable medium of claim 15, wherein the instructions that cause determining occupancy probabilities of the movable target based on the video data comprise instructions that cause:
receiving the video data from a plurality of cameras having overlapping fields of view, the video data including video of an object in the overlapping fields of view; and
determining a three-dimensional position of the movable object based on the video data.

21. The non-transitory computer-readable medium of claim 15, wherein the wireless signal pattern data identifies each of the plurality of fixed locations.

* * * * *